(No Model.) 2 Sheets—Sheet 1.
A. S. CARTWRIGHT.
PNEUMATIC TIRE REPAIRING PATCH.
No. 544,562. Patented Aug. 13, 1895.
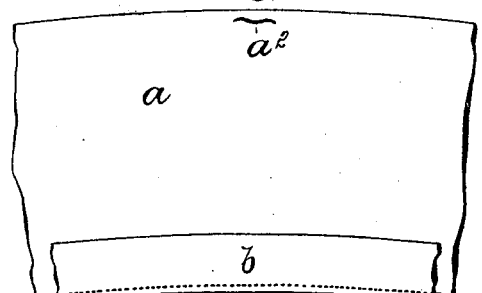
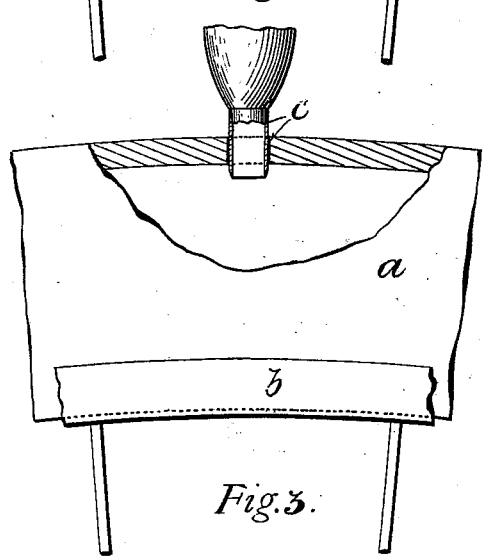
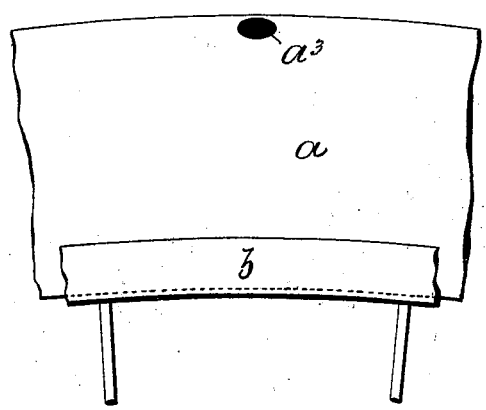
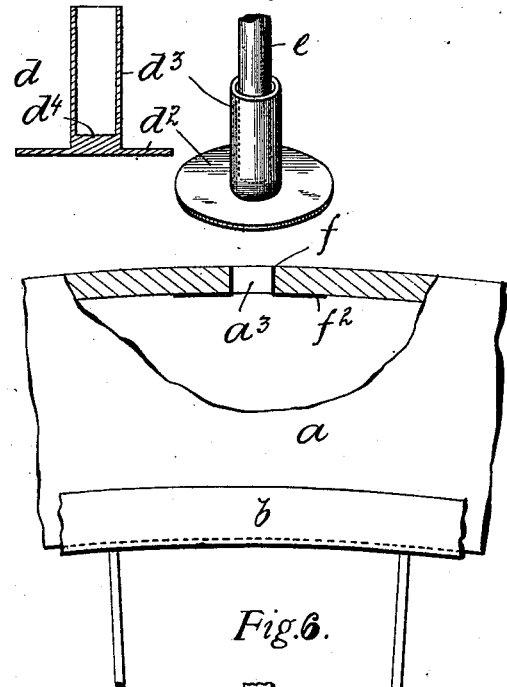
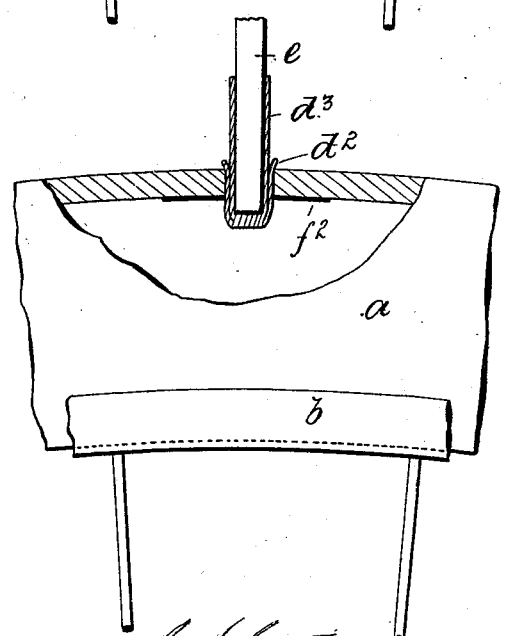
WITNESSES
INVENTOR (No Model.) 2 Sheets—Sheet 2.
A. S. CARTWRIGHT.
PNEUMATIC TIRE REPAIRING PATCH.
No. 544,562. Patented Aug. 13, 1895.
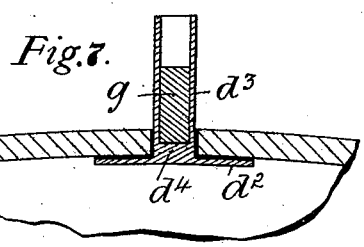
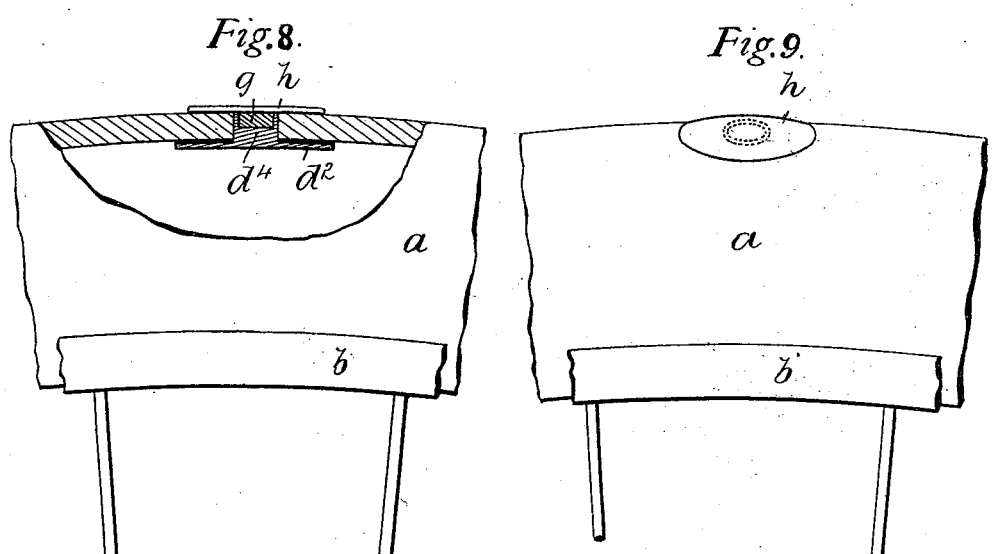
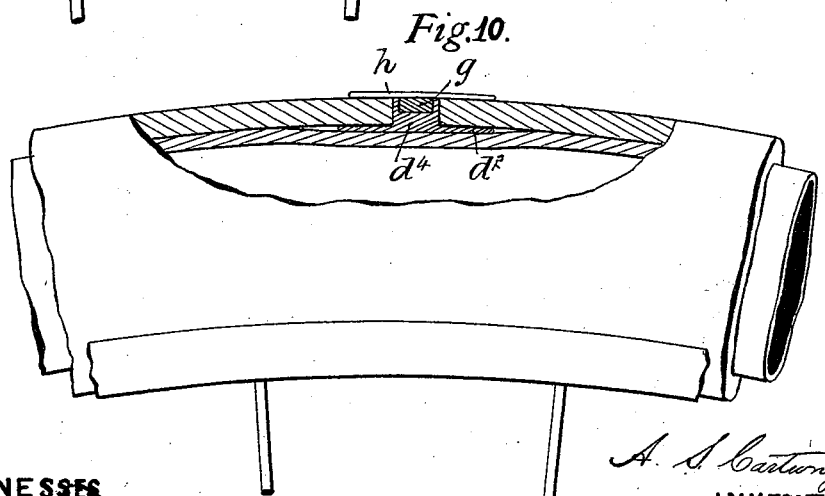

UNITED STATES PATENT OFFICE.

AARON SMITH CARTWRIGHT, OF BIRMINGHAM, ENGLAND.

PNEUMATIC-TIRE-REPAIRING PATCH.

SPECIFICATION forming part of Letters Patent No. 544,562, dated August 13, 1895.

Application filed December 23, 1892. Serial No. 456,175. (No model.) Patented in England July 6, 1892, No. 12,469.

*To all whom it may concern:*

Be it known that I, AARON SMITH CARTWRIGHT, manufacturer, a subject of the Queen of Great Britain, residing at Ford Street, Hockley, in the city of Birmingham, England, have invented a certain new and useful Pneumatic-Tire-Repairing Patch and Means Employed Therewith; and I do hereby declare the following to be a full, clear, and exact description of the invention, reference being had to the accompanying drawings, which form part of this specification, and for which invention Letters Patent of Great Britain have been granted to me, bearing date the 6th day of July, 1892, No. 12,469.

This invention relates to the pneumatic tires of wheels, and has for its object the repairing or making good of the same when punctured or cut, as hereinafter described.

Figure 1 of the accompanying drawings represents a punctured or cut pneumatic tire. Fig. 2 represents a tire with the puncture or cut, and the surrounding material of the same being removed by a wad or circular cutter, so as to leave a clear and symmetrically-formed hole of a given size, which is, as hereinafter described, filled up by the part of the stalk of a patch interiorly applied. Fig. 3 represents the said tire, showing the hole or piercing after the removal of the perforating or cutting-out tool, as shown in operation in Fig. 2. Fig. 4 represents a vertical section of the plug-patch and its stalk. Fig. 5 represents the position of the patch prior to its introduction into the interior of the tire after the walls of the tire contiguous to the piercing have been properly cemented. Fig. 6 represents the threading of the umbrella-like patch through the hole into the interior of the tire. Fig. 7 represents the same passed through and affixed in position after the opening out of the patch or disk part and the drawing of the same by the pulling forward of the stalk, which is subsequently removed by cutting flush to the surface of the tire. Fig. 8 represents the stalk or plug part cut off flush to the tire and a covering-patch placed over the joint formed by the connection. Fig. 9 is an outside view of the repair. Fig. 10 represents the patch applied to a Dunlop tire or one having an inner tube inclosed within an outer one.

$a$ is a pneumatic tire. $b$ is a rim, and $a^2$ represents a puncture or cut within the said tire.

In Fig. 2, $c$ is a wad-cutter, shown cutting away the material around the puncture or cut and leaving a circular hole, which is marked $a^3$, (see Fig. 3,) and which is subsequently filled up with the mending-patch, as hereinafter described.

In Fig. 4, $d$ is a plug-patch of india-rubber or other suitable material with a patch or disk end $d^2$, a hollow stem $d^3$, and a solid lower end $d^4$. The tubular construction of the stem is for the purpose of introducing within it a ram or carrier $e$ for the pushing of the patch part of the combined plug-patch home through the hole $a^3$, as represented in Fig. 6. Then on the same being pushed inwardly to an extent that the edges of the patch are clear of the hole the said patch expands or opens out flat, when by the pulling back of the said patch by the tubular stem $d^3$ the same is brought against the inner side of the walls of the tire, as represented in Fig. 7, and as the said inner walls covered by the patch and comprehending the inner part of the stem were previously cemented, as marked $f f^2$, the said plug-patch is affixedly held in position. To make the said hollow stem of the plug-patch solid, a closer plug $g$ is then introduced and preferably cemented. Then by cutting down the plug flush with the periphery of the tire and covering over the shorn end of the plug or stem by an outside and cemented patch $h$, as represented in Fig. 8, the tire is thereby repaired and a sound patching accomplished.

In Fig. 10 the patching comes between the inner tube and the inside walls of the tire, assuming that only the outer tube has been pierced or cut.

In carrying out my invention in connection with a rent, I pierce a series of contiguous holes and place a series of plug-patches within them and with the patch parts overlapping each other, and with a continuous patch or a series of outside patches applied to the outside plugs, which fill up the holes made.

It will be understood that the tubular construction of the stem admits of the walls of the same falling to the propelling stem or mandrel $e$, and thereby allows the folding patch $d^2$ to take up less room than it would otherwise do and so pass through a made hole whose diameter is of the size as the cross-section of the stem, and, further, it will be understood that the patch is forcibly forced against the part to be repaired by the blowing up of the tire immediately on repair.

Although I prefer employing a hollow stalk or stem to the patch, yet a solid one may be used in lieu thereof, as represented in section in Fig. 10.

The passing of the solid stalk-patch into position will require the hole $a^3$ to be slightly stretched and the patch with hilt of stalk to be slightly compressed, so that after the straightening out of the said patch by virtue of its elasticity the stalk or stem adjacent to it shall expand and be of a diameter equal to the inside of the hole.

The patch may be of caoutchouc, vulcanized rubber, prepared canvas, or silk, or other like materials.

Having fully described my invention, what I desire to claim and secure by Letters Patent is—

1. In combination with a pneumatic cycle tire having the aperture $a^3$, a repairing patch, consisting of the flexible interior disk $b^2$, having the tubular stem $d^3$, passing through said aperture, the plug $g$, inserted in the cavity of said stem and the external disk $h$, secured to the outside of the tire and covering the top of the stem and plug, substantially as described.

2. A repairing patch for pneumatic tires consisting of a flexible disk adapted to fit against the inner surface of a cycle tire, a stalk or stem on said disk adapted to fill the aperture in the tire and having a tubular socket with a thickened bottom part, a plug fitting said socket and an exterior disk covering said plug and the end of said stalk, substantially as described.

In testimony that I claim the foregoing I have hereunto set my hand.

AARON SMITH CARTWRIGHT.

Witnesses:
HENRY L. KERRETT,
ARTHUR T. SADLER.